United States Patent

Mitchell

[15] 3,681,656

[45] Aug. 1, 1972

[54] HIGH POWER WIDE BANDWIDTH PULSE GENERATOR

[72] Inventor: Peter G. Mitchell, Concord, Mass.

[73] Assignee: Ikor, Incorporated, Burlington, Mass.

[22] Filed: Sept. 23, 1970

[21] Appl. No.: 72,888

[52] U.S. Cl. ..................315/223, 307/107, 307/108, 315/240, 315/244, 315/276, 315/306, 315/310, 321/44, 328/63

[51] Int. Cl. ............................H03k 3/35, H03k 3/57

[58] Field of Search......315/219, 223, 240, 244, 276, 315/306, 310; 328/63; 321/44; 307/106–108; 331/127

[56] References Cited

UNITED STATES PATENTS 2,932,802 4/1960 Lorch ..........................331/127
3,223,887 12/1965 Brown.......................315/219 X
3,484,619 12/1969 Proud, Jr. .....................307/106
3,521,121 7/1970 Proud, Jr. .......................315/58

*Primary Examiner*—Roy Lake
*Assistant Examiner*—Siegfried H. Grimm
*Attorney*—Schiller & Pandiscio

[57] ABSTRACT

A pulse generator, particularly useful for synthetic generation of microwaves, in the form of a superatmospheric gas-filled elongated tube having coaxial conductors. The outer conductor is insulated from the inner conductor, and the latter includes a small, air-filled gap of less than 4 mil inches. The central conductor facing one end of the gap is a short (ca. 1 inch) charging line connected in series to a current limiting high resistive impedance. Due to pressurized gas in the short-space gap, very stable pulses with a very accurately controlled repetition rate and pulse height can be produced by suitable modulation. The pulses can exceed several kv. pulse amplitude when the device is powered from a high voltage pulse driving source applied across the outer conductor and the current limiting impedance.

9 Claims, 6 Drawing Figures

PETER G. MITCHELL
INVENTOR.
BY
Schiller & Pandiscio
ATTORNEYS.

HIGH POWER WIDE BANDWIDTH PULSE GENERATOR

This invention relates to pulse generating devices and more particularly to pulse generator devices useful in the production of microwave signals.

A known technique for producing microwave pulse bursts is to generate repetitive pulses and feed them to a filter. An appropriately selected filter will then provide bursts, each corresponding to an input pulse, of microwave energy. The microwave energy is a function of the rise time and amplitude of the input pulse. Generally more energy at higher frequency may be generated as the rise time of the input pulse is reduced and its amplitude increased. A discussion of a typical technique of this type appears in the article by G. R. Ross in *IEEE Transactions* on "Microwave Energy and Techniques," September 1965, pp. 704–706.

Pulses with rise times in the pico-second range can be obtained from generators employing solid state switches which operate quite rapidly. However, these switches are limited in the magnitude of voltages which can be tolerated without break down, so the microwave generation is typically limited to a few watts maximum output power. Pulse generators of the prior art capable of switching much larger potentials are comparatively slow. Thus, the power output of the filter can be high but the frequency in the bursts is quite low and may not qualify as microwaves.

A free-running pulse generation device capable of yielding pulses with very short rise times and yet which are very high voltage is described in U.S. Pat. No. 3,521,121. In this device operating in a free-running mode, switching by arc may occur at different times and thus at different amplitudes, thereby providing unequally spaced pulses of differing magnitudes.

Therefore, a principal object of the present invention is to provide an improvement over the device described in U.S. Pat. No. 3,521,121; i.e., to provide such a device capable of yielding pulses with high-amplitude and broad bandwidth.

Another object of the present invention is to provide pulse generation devices capable of yielding pulses with very short rise times of very high voltage and which can have a very accurately controlled repetition rate.

Still another object of the present invention is to provide pulse generation devices capable of yielding constant repetition rate pulses characterized by very short rise times and very high voltages.

Yet another object of the present invention is to provide pulse generation devices capable of yielding pulses of very short rise times, of very high voltages and yet which have great pulse height stability.

A further object of the present invention is to provide an accurately controlled repetition rate pulse generation device which is very simple and inexpensive.

Still a further object of the present invention is to provide a device of the type described for converting a D-C potential into fast, rise time pulses at a high constant repetition rate.

Yet another object of the present invention is to provide a pulse generation device in which the upper frequency of the generator may be extended above the free-running frequency limit of the device.

The above objects, advantages, and features as well as others, of the present invention are accomplished by providing a device comprising a gas-tight envelope having disposed at opposite ends thereof respectively electrical output and input terminals. The input terminal is connected inside the envelope through a high resistive impedance to a charge storage element. The latter, preferably a single elongated conductor is spaced by a short gap from the output terminal. The interior of the envelope is charged with a gas at superatmospheric pressure. The pulse repetition rate and pulse height of the device are accurately controlled by suitable modulation so as to apply high voltage driving pulses to the device, thereby achieving pulses wherein high power is spread over a wide spectral range.

These and other objects of the invention will, in part, be obvious and will, in part, appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawings wherein:

Figure 1:
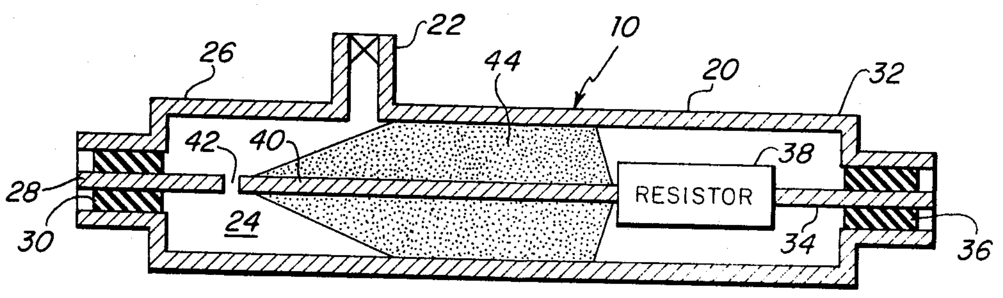
FIG. 1 is a diagram partly in cross-section and partially schematic showing the structure of a pulse generation device employed in the present invention.

Turning now specifically to FIG. 1, there is shown an embodiment of a pulse generator 10 used in the present invention which includes an elongated, hollow, gas-tight envelope 20. At some intermediate position between the ends of envelope 20, sealable port 22 can be provided so that interior 24 of the envelope can be charged or filled with gas at superatmospheric pressure. The gas should be reasonably chemically stable upon passage of an arc therethrough (i.e., will not permanently break down or form gases which will attack the envelope to any substantial extent or is explosive) and will not materially have its electrical properties changed after prolonged arcing. In a typical embodiment, the interior of envelope 20 is filled with a gas such as air, pure nitrogen, other inert gas such as argon, krypton, neon, and the like and mixtures. With air, one can fill at about 150 psi at room temperature, while preferably nitrogen should be at about 200 psi, argon at 400 psi, and typically optimum pressures for each other gas.

In the form shown, envelope 20 is made primarily of an electrically conductive material such as copper, stainless steel, or the like. Alternatively, the envelope can be made of an insulating material such as glass, ceramic, or the like, but in such cases it should be further surrounded by an electrically conductive shield for reasons that will appear later.

One end 26 of envelope 20 has mounted therein an electrically conductive output terminal 28 preferably in the form of an elongated conductor aligned along the long axis of the envelope. Terminal 28 is electrically insulated from the envelope by a coaxial bushing 30 of appropriate material such as glass, polytetrafluorethylene or the like. The other end 32 of envelope 20 is similarly provided with an elongated input terminal 34 colinear with terminal 28 and electrically insulated from the envelope by bushing 36. Both terminals therefore provide electrical pathways from the interior to the exterior of the envelope.

The end of terminal 34 disposed within interior 24 of envelope 20 is electrically connected to and mechanically supports one side of resistive impedance 38. The other side of impedance 38 is connected to one end of elongated line storage element 40 which is shown as a length of electrically conductive material also disposed colinearly with terminals 28 and 34. The other end of element 40 is separated from the inner end of terminal 28 by a short gap 42 which, of course, is filled with a reasonably chemically stable gas at superatmospheric pressure. Preferably the facing ends of element 40 and terminal 28 are formed of low-emissivity, refractory, conductive material such as tungsten or the like. The spacing between element 40 and terminal 28 importantly is less than about 3 to 4 mil inches.

In one embodiment of the invention, the interspace between element 40 and the interior wall of envelope 20 is provided with material 44 which provides mechanical support to keep element 40 properly aligned and also is microwave energy absorbing, e.g., an epoxy resinous filler which can be slotted to allow uniform gas pressure distribution within the envelope if desired. In another embodiment resistor 38 is affixed to element 40 and the material 44 is not required.

It will be seen that end 32 of the envelope together with terminal 34 can readily be formed as a coaxial connector as can terminal 28 and end 26, and the envelope and inner conductors in effect form a coaxial transmission line. Thus, as well known, the dimensions and spacing of envelope 20, and the central conductors depend upon the transmission line impedance desired. Design of the coaxial output connector formed of terminal 28, dielectric 30 and end 26 of the envelope, requires that it provides a uniform transmission line impedance, typically 50 ohms, matching that of the device into which the pulse energy is to be fed. The electrical length of element 40 determines the length or duration of the pulse produced.

Figure 2:
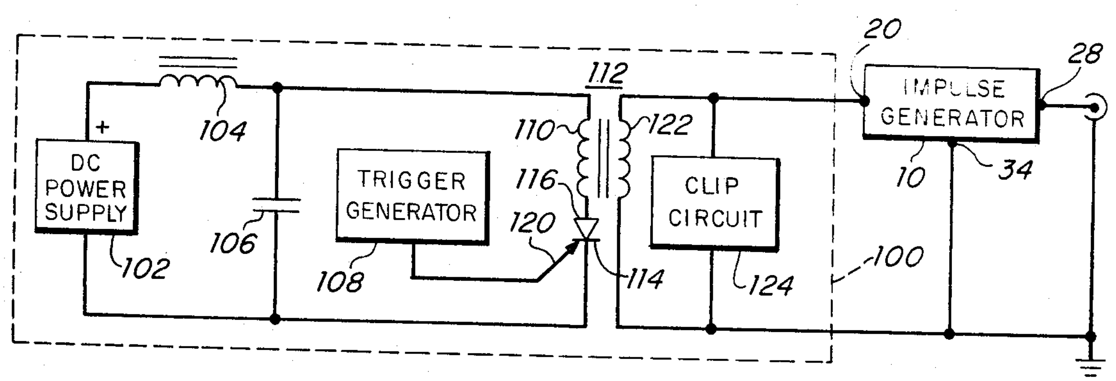
FIG. 2 is a schematic diagram of a pulse generation circuit in accordance with the present invention employing the device shown in FIG. 1.

FIG. 2 shows a pulse generation circuit 100 which employs the pulse generator 10 shown in FIG. 1. Circuit 100, shown in block form enclosed with broken lines, permits generator 10 to provide pico-second pulses. Circuit 100 is a modulator circuit which includes a D-C power supply 102, such as, for example, a battery. Connected in series across the terminals of supply 102 is a resonant charging circuit formed in the usual manner from charging inductor or choke 104 and capacitor 106. Primary winding 110 of pulse transformer 112 in series with controlled rectifier or SCR 114 are connected across capacitor 106. SCR 114 has the usual anode 116, cathode 118 and gate 120 of which anode 116 is connected to winding 110 and cathode 118 is connected to capacitor 106. Trigger generator 108, which may be of any known configuration, is connected to gate 120. Connected in parallel across secondary winding 122 of transformer 112 is high voltage clipping circuit 124. Pulse generator 10 is connected to clipping circuit 124 such that one terminal of circuit 124 is connected to envelope 20 and the other terminal of circuit 124 is connected to terminal 34. The output of terminal 28 of generator 10 may be connected to a coaxial line as shown.

Figure 3:
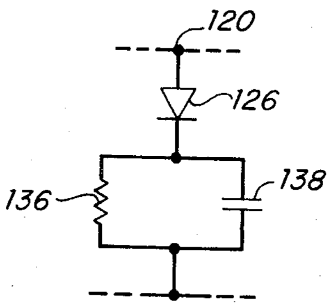
FIG. 3 is one embodiment of a circuit diagram of the high voltage clipping circuit shown in block form in FIG. 2.

One embodiment of the high voltage clipping circuit 124 is shown in FIG. 3. In this embodiment circuit 124 includes diode 126 having its anode connected to one end of secondary winding 122. The cathode of diode 126 is connected in series with a RC circuit made up of parallel resistor 136 and capacitor 138 which are both connected to ground. This embodiment of circuit 124 is used if the pulse repetition rate is constant as will be explained.

Figure 4:
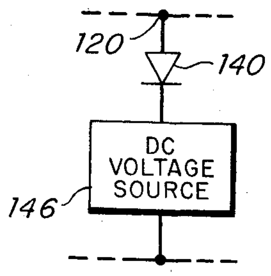
FIG. 4 is another embodiment of a high voltage clipping circuit shown in block form in FIG. 2.

Another embodiment of clipping circuit 124 is shown in FIG. 4. In this embodiment circuit 124 includes a diode 140 having its anode connected to one end of secondary winding 122. The cathode of diode 140 is connected to a high D-C voltage source 146 of any one of a number of well known configurations. The positive terminal of source 146 is connected to cathode 144 and negative terminal is connected to ground. This embodiment of circuit 124 is used if it is desired to change or vary the pulse repetition rate.

In operation of the present invention, D-C power supply 102 resonantly charges capacitor 106 through inductor 104. Such charging techniques are well known in the art. Charging continues until the charge on capacitor 106 reaches a value which is approximately twice the voltage of supply 102. The charge on capacitor 106 is then switched by SCR 114 which is triggered by a signal from generator 108 through gate 120. SCR 114 is turned off by a back-swing from current continuing in transformer primary winding 110 and causing a reverse voltage to appear across SCR 114 from anode 116 to cathode 118.

Thus, one can produce a series of pulses which appear at the secondary winding 122 of pulse transformer 112 at a rate determined by trigger generator 108. The generator may operate at any repetition rate below approximately 5 KHz which is the frequency limitation of the SCR. A typical operating rate for generator 108 is 250 Hz. The pulses appearing on secondary winding 122 can readily be as high as approximately 6 kv.

In order to achieve constancy of magnitude from pulse to pulse, the invention provides clipping means 124. The clipping circuit shown in FIG. 3 is intended to provide clipping tailored to the repetition rate of the trigger generator and at low cost. To this end, one selects the values of resistor 136 and capacitor 138 so that the D-C level at the cathode of diode 126 can build up only to a desired clipping level, for example, 5 kv, by permitting any charge above 5 kv to bleed from capacitor 138. Clipping occurs, therefore, at an arbitrary level set simply by the repetition rate from generator 108 and the values of resistor 136 and capacitor 138.

The clipping system shown in FIG. 4 on the other hand permits one to vary the repetition rate from generator 108, but because it employs a separate voltage source 146, it is somewhat more costly to build. Here diode 140 serves to clip the pulses appearing in winding 122 in the same manner as in FIG. 3, but at a level determined, of course, by the constant voltage set at the cathode of the diode by source 146.

Figure 5:
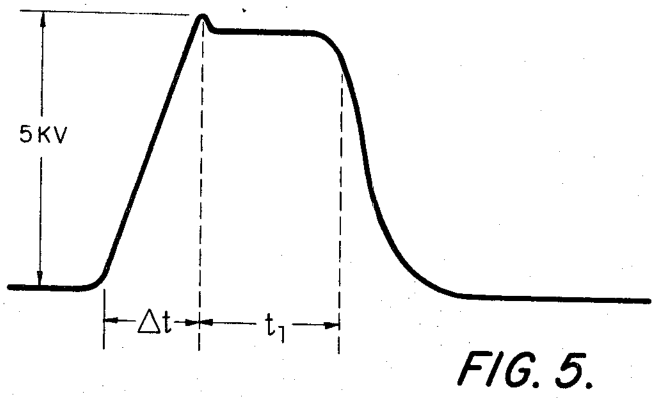
FIG. 5 is a typical waveform showing a driving pulse generated by the circuit in FIG. 2 and applied to the pulse generation device of FIG. 1.

The driving pulse (for example, 5 kv) provided by clipping circuit 124 is shown in FIG. 5. Typically, the rise time $\Delta t$ of the 5 kv pulse is approximately 0.3 microseconds and the pulse has a plateau time, $t_1$, of approximately 1 microsecond. The pulse repetition rate of the modulator circuit 100 producing the clipped driving pulses for pulse generator 10 is limited in the embodiment shown by the time required to turn off SCR 114. Therefore, the maximum repetition rate of the embodiment shown is approximately 5 KHz. To extend the frequency of the system, slight modification would be required for the modulator circuit.

Figure 6:
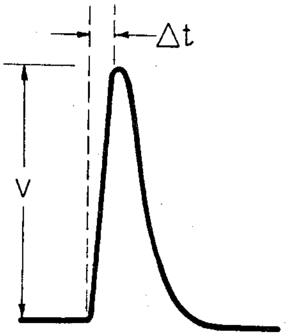
FIG. 6 is a typical waveform showing an output pulse from the pulse generation device of FIG. 1.

The rise time of pulse generator 10 in FIG. 1 is tailored to be similar to the rise time of the modulator circuit shown in FIG. 2 and described above. Envelope 20 is connected to the ground side of clipping circuit 124, and terminal 34 of generator 10 is connected to the high voltage of secondary winding 122 which is in parallel with the other terminal of clipping circuit 124. The 5 kv pulses applied from clipping circuit 124 through current limiting impedance 38 charges element 40. Typically, impedance 38 is a resistor of the order of 30,000 ohms. Impedance 38 serves to limit the peak current into generator 10, provides the necessary discontinuity so that the voltage of impedance 38 tracks the driving pulses to provide the very short output pulses from generator 10, and attenuates the unwanted portion of the driving pulses from the modulator circuit 100. The charge element 40 builds up until dielectric breakdown occurs across gap 42. The latter, being very short, insures that the rise time of the resulting pulse (shown as the left-hand edge of FIG. 6) is very short. For example, with a 3-mil inch gap and a maximum amplitude V of approximately 1 kv into a surge resistance of approximately 50 ohms for the pulse of FIG. 6, the rise time at half height will be approximately 100 picoseconds, with a similar width.

As the repetition rate of the pulses driving impulse generator 10 is lowered or reduced, it has now been found that the need for a gas with quenching properties is diminished. Hence, for use at low repetition rates e.g., 1 KHz and below), the impulse generator can be filled with gas which may not have good quenching properties at high frequencies. This is believed to be primarily due to the fact that decay of ionization will take place by other mechanisms such as recombination and diffusion.

The pulse length, of course, from generator 10 is determined by the transit time required for an electrical wavefront to traverse element 40, hence is equal to twice the electrical length of element 40. For example, to obtain a short pulse in the subnanosecond range, element 40 will be about one inch long. Thus, element 40 is typically about one-half inch long and may range in length up to 2 inches or longer. The pulse height stability of the output pulses is achieved by having the constant plateau during period $t_1$, on the driving pulse as seen in FIG. 5. The height variation between output pulses can be held to and indeed has been measured to be as small as 0.1 db. The value of impedance 38 (from about 10,000 to 50,000 ohms and typically 30,000 ohms) prevents or limits continuous current flow which would tend to sustain arcing across gap 42. The value of impedance 38 also limits the time required to charge element 40 and should be low enough to achieve reasonably good tracking of the envelope of the input waveform.

The use of superatmospheric pressure is important inasmuch as the higher pressures tend to stabilize the pulse shape from pulse to pulse, particularly the maximum amplitude of the pulses. The spacing of gap 42 is also important in that very short spacing; i.e., 3–4 mil inches at the high gas pressure, provides the desired very high pulse rise times ranging around 100 picoseconds. The use of microwave-energy-absorbing material 44, while optional, reduces noise or echoes produced by reflection in element 40 from gap 42 or from the output load into which the pulse is fed.

The pulse generator of the present invention has a number of applications. A few examples of such applications include: (1) Generation of a high power white spectrum for EMI testing of electronic components and circuits; (2) A comb that will give adequate power in the bands; (3) Use in time domain reflectometry where distance and attenuation make it necessary to have a considerably larger signal than is now available; (4) Study of radar in the time domain, by transmission and reception of the pulse. An impulse represents the ultimate in short pulse radar, which allows resolution in time of objects at different distances, an advantage not available with longer pulses or CW.

Since certain changes may be made in the above apparatus, without departing from the scope of the invention herein involved, it is intended that all matter contained in the above description or shown in the accompanying drawing shall be interpreted in an illustrative and not in a limiting sense.

What is claimed is:

1. In a pulse generator having a sealable elongated envelope containing therein a gaseous atmosphere at superatmospheric pressure, a pair of coaxial spaced-apart conductors extending along said envelope, at least the inner conductor being disposed within said envelope and having opposite ends extending outwardly from corresponding ends of said envelope, said inner conductor having a gap therein of less than about 4 mil inches, a charge-storage section immediately adjoining said gap, and a resistive impedance coupled between said charge-storage section and a corresponding end of said inner conductor; the improvement comprising means for applying a series of high voltage pulses at a substantially fixed amplitude across the outer conductor and the end of the inner conductor directly connected to said impedance.

2. The improvement in a pulse generator as defined in claim 1 wherein the means for applying said pulses comprises charge storage means;

means for resonantly charging said charge storage means;

means for periodically discharging said charge storage means; and means for clipping pulses formed by the discharge of said charge storage means.

3. The improvement in a pulse generator as defined in claim 2 wherein said means for discharging is operable at a predetermined repetition rate. said charge storage means from said supply at 4. A pulse generator as defined in claim 1 wherein said applying means is a modulator circuit comprising a D-C power supply; charge storage means; means for charging said charge storage means from said supply at a voltage of approximately twice the voltage of said supply; a pulse transformer; means for switching said stored charge through the primary winding of said transformer at a predetermined pulse repetition rate so as to provide a plurality of driving pulses and; means for clipping said driving pulses to an amplitude value which is substantially the same from pulse to pulse.

5. A pulse generator as defined in claim 4 wherein said means for clipping comprises unilateral current conductive means connecting the secondary winding of said transformer to an RC circuit having values selected to determine said amplitude value.

6. A pulse generator as defined in claim 4 wherein said means for clipping comprises unilateral current conductive means connecting the secondary winding of said transformer to a source of substantially constant D-C voltage at substantially said amplitude value.

7. A pulse generator having a sealable elongated envelope containing therein gaseous atmosphere at superatmospheric pressure;

a pair of coaxial spaced-apart conductors extending along said envelope, at least the inner conductor being disposed within said envelope and having opposite ends extending outwardly from corresponding ends of said envelope;

said inner conductor having a gap therein of less than about 4 mil inches, a charge-storage section immediately adjoining said gap, and a resistive impedance coupled between said charge-storage section and a corresponding end of said inner conductor; and means for applying high voltage pulses of a predetermined repetition rate below about 1 KHz between the outer conductor and the end of the inner conductor directly connected to said impedance.

8. A pulse generator as defined in claim 7 wherein said gas is nitrogen.

9. A pulse generator as defined in claim 8 wherein said gas is an inert gas.

* * * * *